(12) United States Patent
Wick, Jr.

(10) Patent No.: US 8,441,625 B2
(45) Date of Patent: May 14, 2013

(54) LASER BEAM PROFILE MEASUREMENT

(75) Inventor: Peter L. Wick, Jr., Fredericksburg, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 254 days.

(21) Appl. No.: 12/932,933

(22) Filed: Mar. 2, 2011

(65) Prior Publication Data

US 2012/0314210 A1   Dec. 13, 2012

(51) Int. Cl.
*G01J 1/00* (2006.01)

(52) U.S. Cl.
USPC .......................................................... 356/121

(58) Field of Classification Search .................... 356/121
See application file for complete search history.

(56) References Cited

U.S. PATENT DOCUMENTS

| | | | |
|---|---|---|---|
| 4,157,223 A | 6/1979 | Skolnick | 356/354 |
| 4,640,573 A | 2/1987 | Kataoka et al. | 350/6.1 |
| 4,645,917 A | 2/1987 | Penney et al. | 250/201 |
| 4,745,280 A | 5/1988 | Gi et al. | 250/347 |
| 4,797,555 A | 1/1989 | La Mar | 250/336.1 |
| 4,884,697 A | 12/1989 | Takacs et al. | 356/360 |
| 5,064,284 A | 11/1991 | Johnston et al. | 356/121 |
| 5,258,821 A * | 11/1993 | Doggett et al. | 356/496 |
| 6,046,812 A | 4/2000 | Baik et al. | 356/376 |
| 6,532,068 B2 | 3/2003 | Detalle et al. | 356/318 |

OTHER PUBLICATIONS

C. B. Roundy, "Current Technology of Laser Beam Profile Measurements", ICALEO Short Course, Sep. 2000, Spiricon, Inc. http://aries.ucsd.edu/LMI/TUTORIALS/profile-tutorial.pdf or http://www.ophiropt.com/user_files/laser/beam_profilers/C_Roundy_Tutotial.pdf.

* cited by examiner

*Primary Examiner* — Roy M Punnoose
(74) *Attorney, Agent, or Firm* — Gerhard W. Thielman Esq.

(57) ABSTRACT

A method for characterizing a laser beam profile is provided. The method includes disposing a laser target, moving the surface of the target, directing a laser to emit the beam at the surface, measuring a reflection from the surface as intensities, and averaging the intensities. The target's surface is disposed substantially perpendicular to an incident direction. The surface is reflective at a wavelength corresponding to the laser beam. The travel direction is substantially parallel to the surface. The laser beam travels along said incident direction to the surface. The reflection represents a plurality of intensities having a distribution of positions along the surface and during a temporal interval. The intensities are averaged over the temporal interval for each position of the distribution to produce an analyzed beam profile. Each position corresponds to a speed along the travel direction based on movement of the surface. The surface can be preferably spun along an axis substantially parallel to the incident beam.

7 Claims, 5 Drawing Sheets

LASER BEAM PROFILE MEASUREMENT

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

COLOR DRAWINGS

The application file originally included at least one drawing executed in color. Any such drawings have been replaced in black-and-white form.

BACKGROUND

The invention relates generally to intensity measurement of a laser beam. In particular, the invention relates to providing high resolution for a laser reflection profile.

A laser beams produces coherent (i.e., in-phase) monochromatic (i.e., single-wavelength) light. These properties enable a laser beam to be focused on a small intense spot in a highly concentrated area. The profile of the laser beam affects energy density, concentration and collimation of the light.

Common profile forms include Gaussian for maximum concentration and flat-top for uniform illumination. Measuring this profile becomes necessary to determine suitability of a laser emitter for appropriateness to a particular application, as well as its performance characteristics. See http://aries.ucsd.edu/LMI/TUTORIALS/profile-tutorial.pdf for additional information.

SUMMARY

Conventional laser profile calibration techniques yield disadvantages addressed by various exemplary embodiments of the present invention. In particular, various exemplary embodiments provide a method for characterizing a laser beam profile. The method includes disposing a laser target, moving the surface of the target, directing a laser to emit the beam at the surface, measuring a reflection from the surface as intensities, and averaging the intensities.

In various exemplary embodiments, the target's surface is disposed substantially perpendicular to an incident direction. The surface is reflective at a wavelength corresponding to the laser beam. The travel direction is substantially parallel to the surface. The laser beam travels along said incident direction to the surface. The reflection represents a plurality of intensities having a distribution of positions along the surface and during a temporal interval.

In various exemplary embodiments, the intensities are averaged over the temporal interval for each position of the distribution to produce an analyzed beam profile. Each position corresponds to a speed along the travel direction based on movement of the surface. In various embodiments, the surface spun along an axis substantially parallel to the incident beam. In other embodiments, the surface can be translated longitudinally, such as by a roller belt.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Beam profiling using target planes and images sensors has become a widely used technique for measuring high power laser beams. Use of image sensors for this purpose gives the test operator beam profiles having higher resolution than are attainable using alternative techniques. However, conventional planes introduce artifacts that must be understood and compensated for during the analysis process. Various exemplary embodiments provide techniques used for beam profile image analysis that provide high reliability and simplify the overall procedure.

Figure 1A:
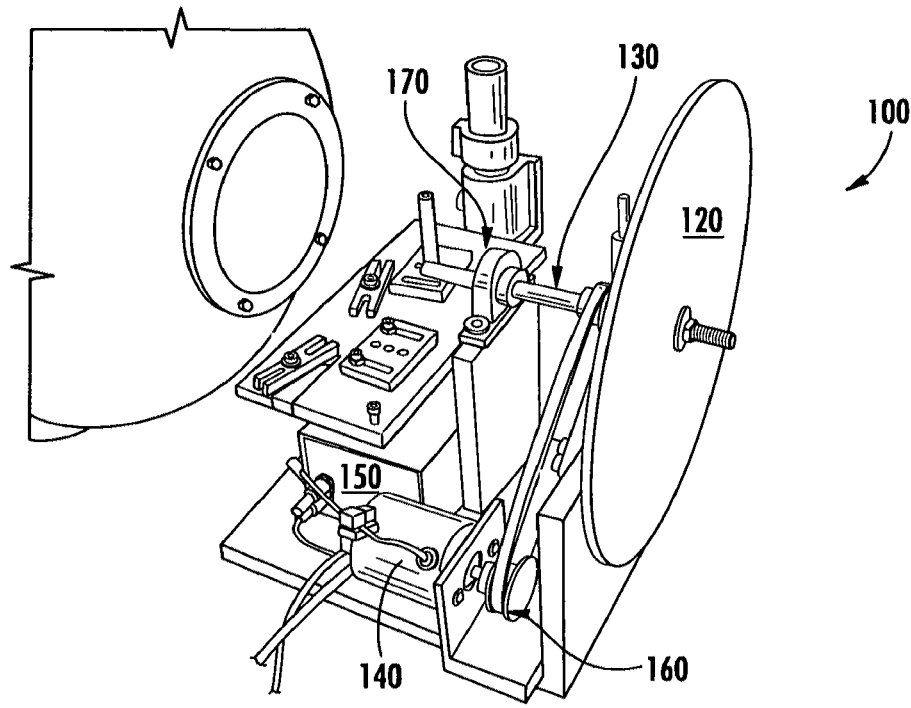
FIGS. 1A and 1B are perspective views of a laser reflection apparatus.
Figure 1B:
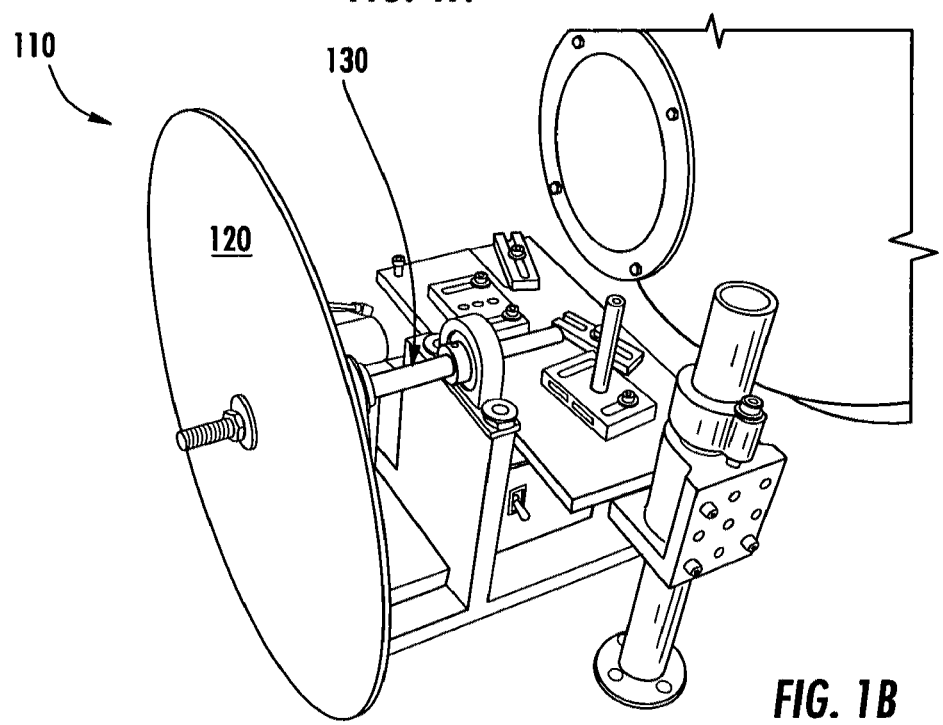

FIGS. 1A and 1B show perspective views 100 and 110 of a laser reflection apparatus. An aluminum plate 120 represents the reflection target that receives a laser beam from an emission source. A mandrel 130 mounts perpendicular to the plate 120. A motor 140 operated through a speed control 150 rotates the mandrel 130 via a pulley 160. An in-line bearing 170 provides structural support for the mandrel 130 for spinning the plate 120 and thereby minimize precession. The laser beam strikes the plate 120 perpendicular to its surface, which reflects the electromagnetic energy to enable calibration of the beam and thereby characterizing the beam profile. Spinning the plate 120 by the motor 140 provides advantages in profile smoothing. The purpose of this apparatus is described further herein.

The characteristics of a Gaussian or a super-Gaussian beam should be understood prior to performing an analysis. Commonly accepted rule-of-thumb measurements of beam diameter are usually reported as $1/e^2$ diameters or radii. Caution should be exercised in determining the $1/e^2$ parameter in physical systems. The diameter parameter $1/e^2$ can be defined as the point in the beam profile where the signal magnitude is 13.5% of the peak of the beam.

For a pure Gaussian beam, this equates to twice the standard deviation of the Gaussian profile. Unfortunately, the beam profile rarely exhibits purely Gaussian shapes. Moreover, symmetric beam profile has been demonstrated to have even greater rarity. One common practice traces the profile down until reaching the 13.5% point. At that location, the first such point from the centroid of the beam is the radius.

In highly structured or multimodal profiles this conventional procedure is prone to underestimate the overall width of the beam and an alternative technique must be used. One alternative procedure involves the D4sigma (or D4σ) method. This process calculates the beam size based upon the entire grid space for the image. The process of D4σ represents beam diameter at four times (4×) the standard deviation σ. Due to the radius-square term, the wings of the beam profile are weighted more than the center.

This process may be subject to overestimation of the beam size due to background within the image. Thus only upon removing background in the image profile can the D4σ method prove successful. D4σ has the advantage of being only minimally susceptible to multimodal or noisy beam profiles if appropriate measures are taken to deal with the profile background. Lastly, the use of non-linear least squares algorithms can provide insight into the actual beam size measured for utilization as a predictive method for the beam's $e^2$ width.

A Gaussian profile Y for a radial distance $X_i$ can be represented as follows:

$$Y = Y_0 + a\exp\left[-0.5\left(\frac{|X_i - \overline{X}|}{\sigma}\right)^n\right],$$

where $Y_0$ is the direct current (DC) offset present in the profile, a is the pre-exponential term; $\overline{X}$ is the Mean, σ is the standard deviation, and n is the Gaussian power term.

Figure 2A:
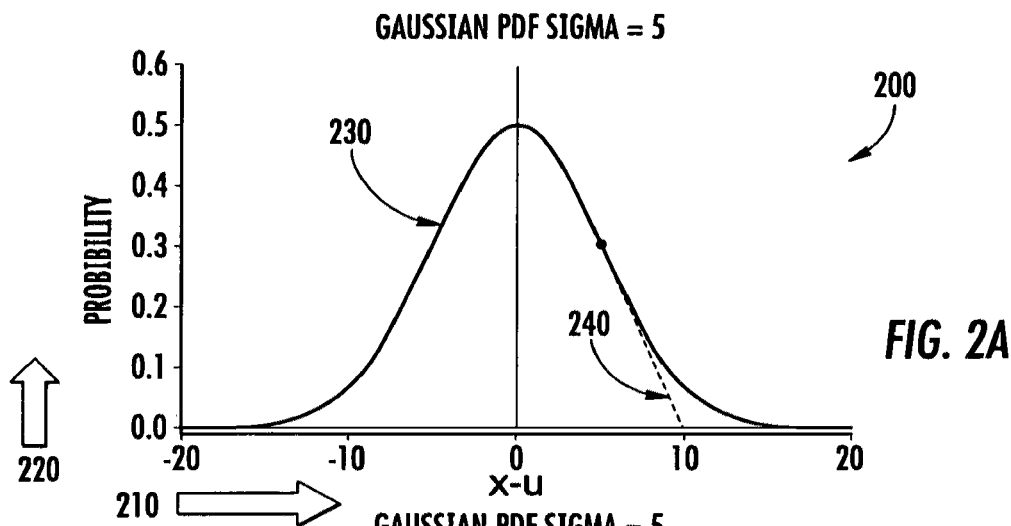
FIGS. 2A through 2C are plot diagram views of probability density functions.
Figure 2B:
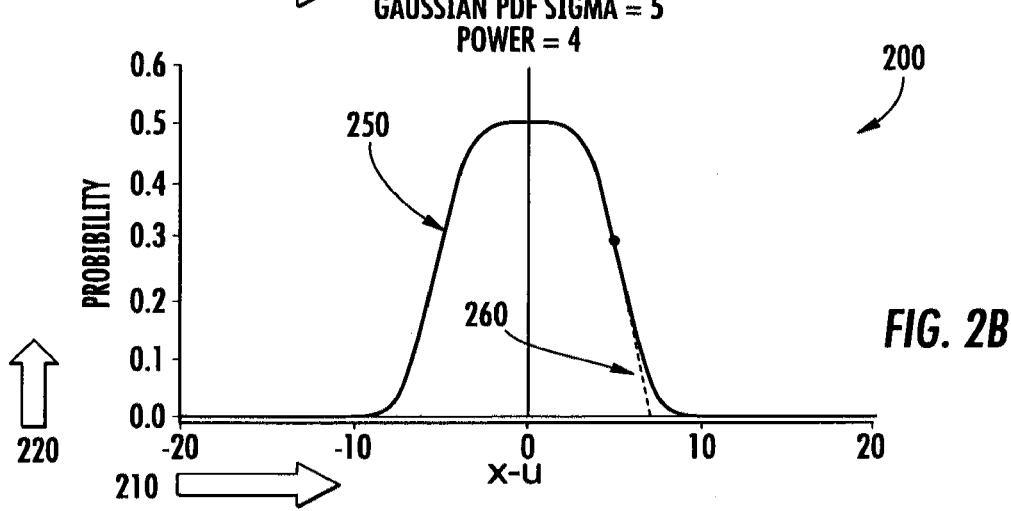
Figure 2C:
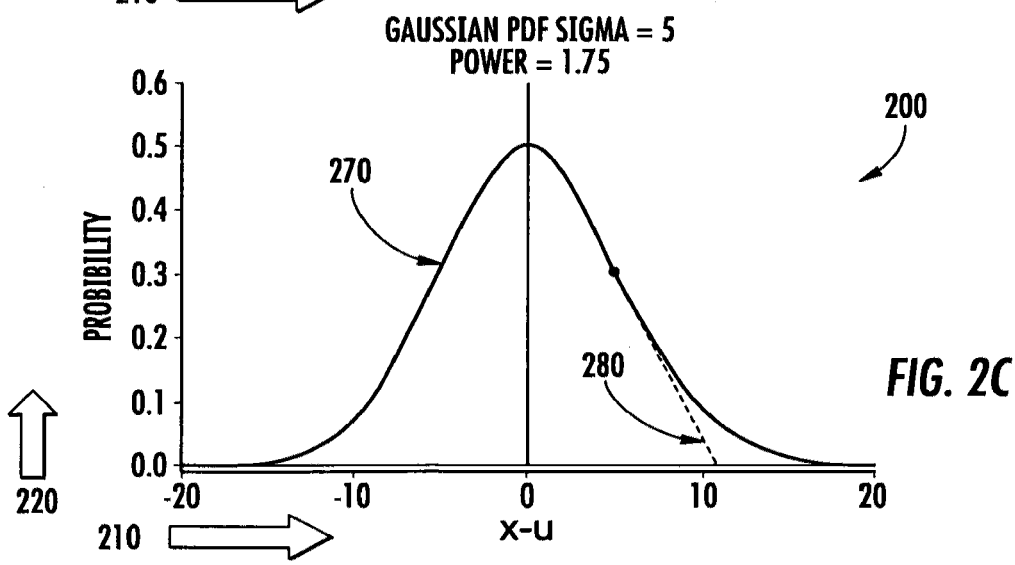

FIGS. 2A, 2B and 2C show plot diagram views 200 of Gaussian probability density functions (PDFs) in which distance from center in micrometers (μm) represents the abscissa 210 and probability represents the ordinate 220. In FIG. 2A, a first Gaussian bell-curve 230 for power p=2 illustrates the relationship for probability, with a peak at 50% at the centerline (x=0, so that offset μ=0). A first tangent line 240 at one standard deviation (σ=1) at x=5 intercepts the abscissa 210 at x=±10.

In FIG. 2B, a second Gaussian bell-curve 250 for power p=4 illustrates the relationship for probability, with a peak at 50% at the centerline (x=0). A second tangent line 260 at one standard deviation (σ=1) at x=4 intercepts the abscissa 210 at x=±8. In FIG. 2C, a third Gaussian bell-curve 270 for power p=1.75 illustrates the relationship for probability, with a peak at 50% at the centerline (x=0). A third tangent line 280 at one standard deviation (σ=1) at x=5 intercepts the abscissa 210 at x=±12.

Figure 3:
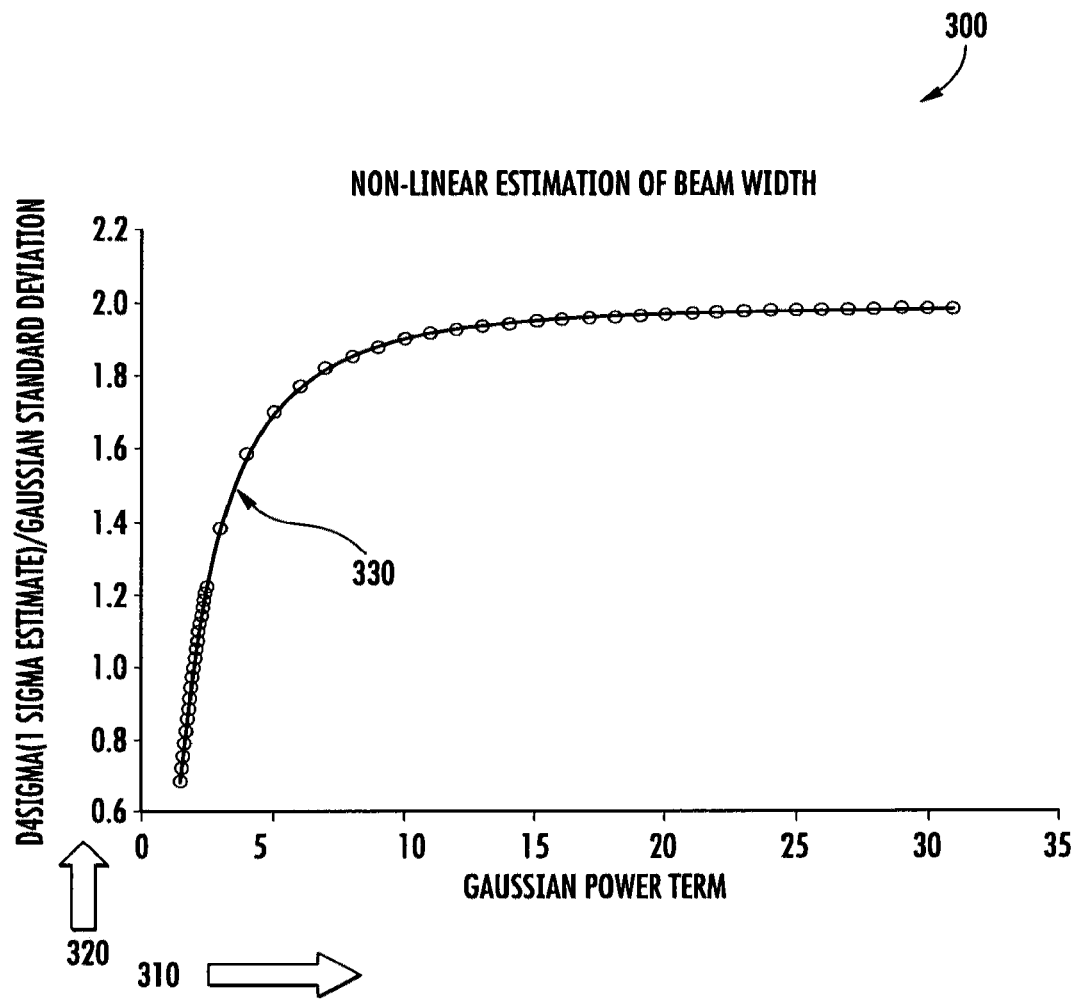
FIG. 3 is a plot diagram view of a beam width relationship.

FIG. 3 show plot diagram view 300 of a beam width relationship in which the ratio of D4σ and Gaussian standard deviation represents the abscissa 310 and Gaussian power term (GPT) represents the ordinate 320. The beam width function curve 330 varies from the normalized abscissa value of about 0.7 at minimum GPT of about two and rises rapidly to asymptotically equilibrate at about 2.0 at GPT of about thirty-five.

The beam's $e^2$ width or 86% point for a Gaussian profile can be examined where the GPT varies away from 2.0. In these profile curves 230, 250 and 270, the respective slope lines 240, 260 and 280 drawn tangent to the steepest decent of the profile. The intercept on the abscissa 210 constitutes the $1/e^2$ point. With the GPT of 2.0 the intercept is apparently exactly twice (2×) the standard deviation. However, as the Gaussian power term increases the $1/e^2$ point approaches the standard deviation and at lower GPT the intercept is more than twice the standard deviation.

This model aids in providing an assessment of the 86% inclusion point or $e^2$ width to understand the relationship between the GPT and the $e^2$ width. To accomplish this, D4σ and pure noise-free beam profiles can be evaluated at various GPT values. D4σ does not estimate the 86% inclusion and at higher Gaussian terms the power inclusion rises in excess of 86%. Fortunately, most real beams do not exhibit extraordinarily high GPTs and the model remains valid under most circumstances. With the model in various exemplary embodiments, a predictive curve 330 can be generated for $e^2$ width as a function of GPT.

The curve 330 illustrates the relationship between the two different terms: D4σ calculated from the grid-space, and the non-linear estimation of the standard deviation for the Gaussian profile. The use of this type of model for beam size estimation provides the capability to relatively easily determine appropriate background subtraction based upon the agreement between grid space calculations for D4σ and non-linear estimation. Additionally, the beam size can be defined mathematically, thus facilitating calculations for irradiance with a well-defined size and power inclusion window.

This technique provides the capability to measure laser beam profiles with a greater degree of fidelity than attainable with alternate target based techniques. The improvement of signal-to-noise ratio simplifies the observation of beam structure with little to no post acquisition filtering or smoothing required.

Figure 4A:
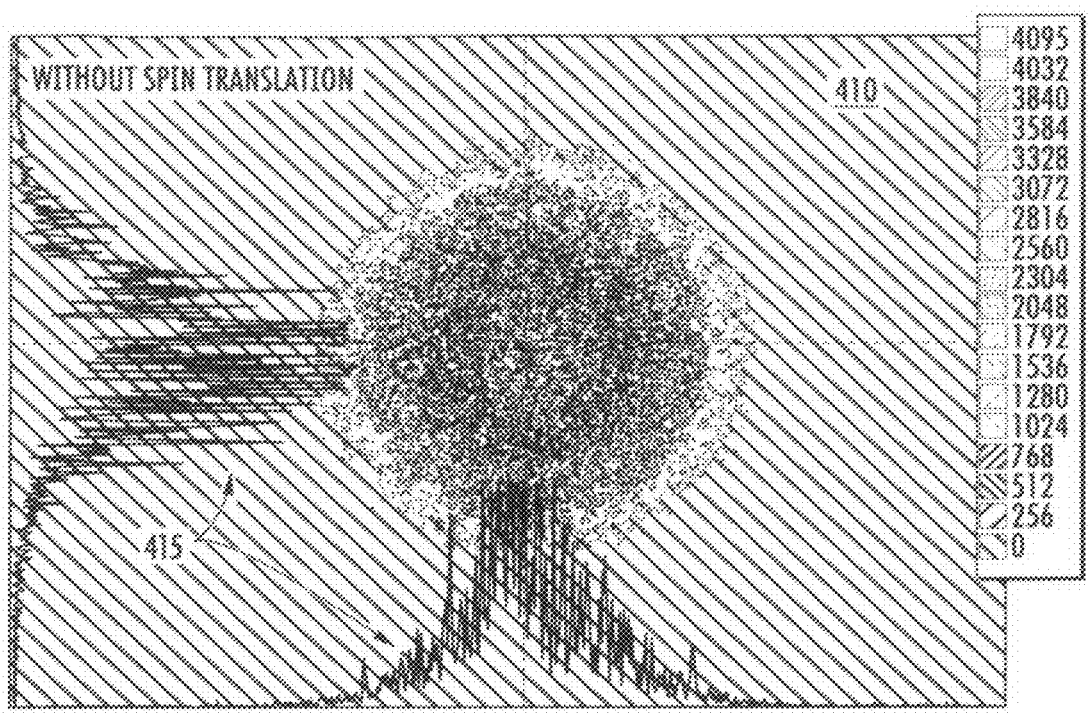
FIGS. 4A and 4B are plan views of laser reflection profiles.
Figure 4B:

FIGS. 4A through 4D show simulation views 400 of laser reflection profiles. FIG. 4A provides a plan view 410 of a noisy beam profile without spin translation. This shows peak power in the green-yellowish center and cross-section profiles 415 in orthogonal axes that correspond to the two-dimensional color plot. FIG. 4B provides a plan view 420 of a clean beam profile with spin translation. This shows peak power with a red center and color gradients corresponding to the rainbow out to violet at the substantially circular peripheral edges.

Figure 4C:
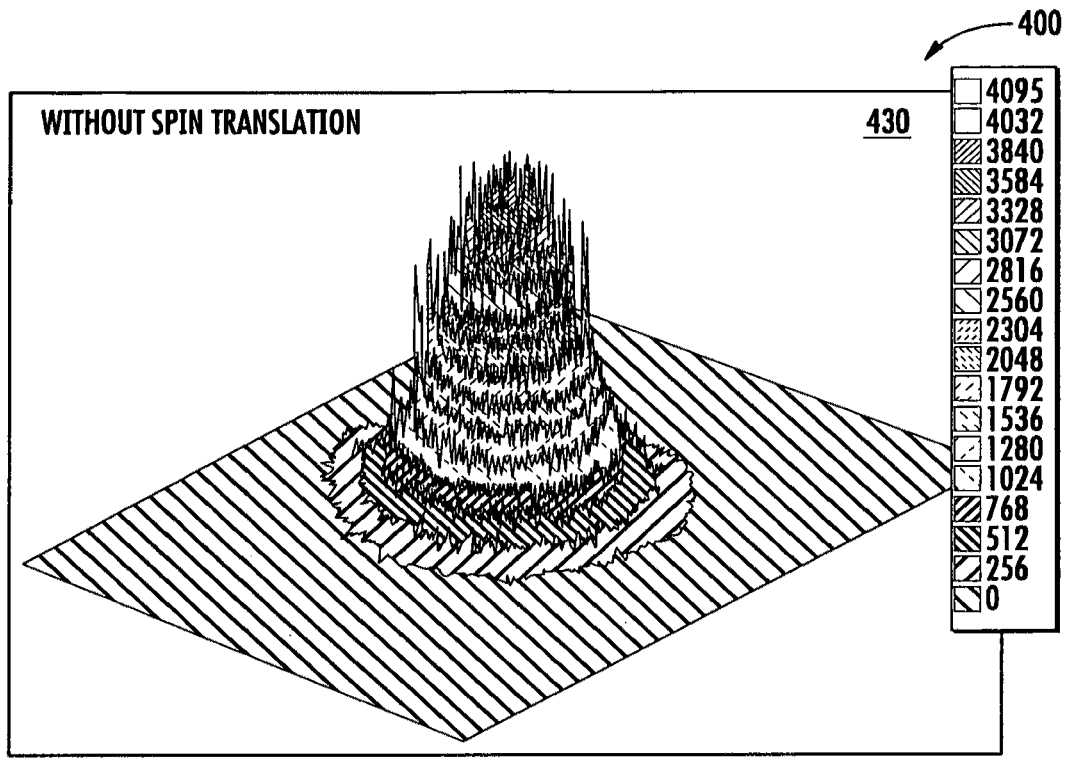
FIGS. 4C and 4D are isometric views of laser reflection profiles.
Figure 4D:
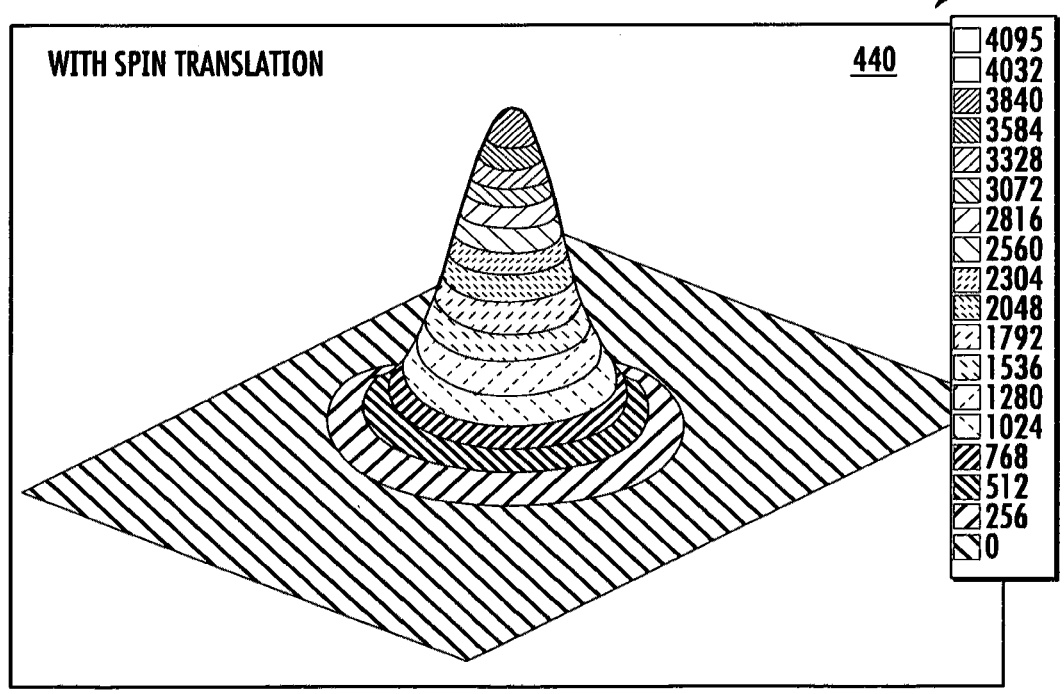

FIG. 4C provides an isometric view 430 of the noisy beam profile without spin translation. The jagged profile indicates considerable noise that can mask quantitative characteristics of the profile. FIG. 4D provides an isometric view 440 of the clean beam profile with spin translation. The smoother profile features much less noise, thereby enabling the laser beam to be analyzed for quality and other performance parameters.

Laser beam profiling and measurement for high energy lasers are performed in a variety of ways. PRIMES GmbH produces a commonly used product for this purpose. This device is capable of directly sampling the laser beam (high energy) with a single photo-detector mounted to a scanning arm and reconstructs a three-dimensional plot of the beam intensity based upon the signal measured at different positions in the scanning aperture. The primary benefit of such a technique is the direct sampling of the beam itself. The disadvantages include (1) lengthy acquisition time, which can be on the order of tens of seconds if average samples are taken), (2) a requirement that the laser beam be perpendicular to the face of the instrument, and (3) a limited three-inch or four-inch diameter aperture.

Another approach uses a charge-coupled device (CCD) imager or camera to sample the entire beam at one time. This achieves a multiplex advantage in data acquisition and improving the resolution of the overall measurement. Many CCD imagers are available for performing this acquisition: Ophir, Spiricon, PCO Pixelfly are commonly utilized. For a laser beam of low enough power, the beam can be directly profiled on the surface of the CCD camera. However, with the high energy lasers, this cannot be so easily accomplished. Common practice involves using a reflective target to image a small fraction of the beam, materials such as Macor, a machineable ceramic and spectralon, a polymer with high reflectivity are the products of choice.

When measuring a beam profile using these camera and target combinations, a great deal of "structure" can be noted in the resultant image, the structure is largely a function of the grain size, or smoothness of the target itself and not related to the properties of the beams. In many cases, the observed structure dominates the measured profile and the fine structure associated with the laser beam itself can be lost.

Various exemplary embodiments take advantage of the target being used to provide a reflection point for the light and a focus plane for the imager, despite imager being used to measure the beam profile. Analogous to simple photography, if a photograph of a scene is taken viewed through the spokes of a stationary bicycle wheel, the spokes can be observed and obscure parts of the image. However, if the wheel is moving, a clear image may be obtained through the spokes because their obstruction blurs and averages with the visible portions over a time-elapsed viewing interval. Therefore by moving or rotating the target plane, a clear image of the laser beam profile can be obtained, predominantly limited by the noise characteristics present in the imager and the structure in the laser beam due to environmental effects.

The target surface can be moved linearly or angularly. Linear motion of a target surface can be accomplished by, for example, in the manner of a conveyor belt on rollers whose axes are parallel to the target surface. Angular motion of a target surface can be accomplished, for example, as a disk that is rotated along a spin axis substantially perpendicular to the target surface on the disk. The latter apparatus is shown in perspective view 100, with the anodized or painted aluminum plate 120 representing the disk, being rotated around its spindle axis on the mandrel 130 by the motor 140. The plate 120 represents the reflection target that receives a laser beam from an emission source.

In operation, only motion, rotary or otherwise of the target (Marcor, Speculation, etc.) is necessitated in the image plane. This motion can be dephased with the acquisition/integration time of the image device (Ophir, Scorpion, Pixelfly, etc.) and standard imaging protocols observed. De-coupling and/or de-phasing of the target motion to image acquisition helps to assure that a random sample of the surface structure is achievable. Synchronizing the imager to the target plane can return some level of undesirable target structure as consistent imagery of a particular target structure is repetitively obtained in this mode of operation.

Through the use of target motion, the grain size or structure of the target material used for the high energy laser profiling is largely removed from the image taken by the CCD camera. The reduction in structure results from the motion of the target relative to the integration time for the image device. That is, if the 'target' motion is rapid relative to the frame rate, the surface structure becomes averaged over the time of the image acquisition. This averaging brings the signal-to-noise ratio for the resultant images up to the extent that the image taken now has the fidelity to visually observe defects in the laser beam and the optics in the laser beam prior to the target plane. With the previous techniques, this type of information was unrecoverable from the data without a complete characterization of the localized surface structure.

Motion of the target plane has the added benefit that damage to the target will be less likely for any given laser power based on temporal distribution of the emission energy. The motion has in effect increased the area on the target so that the laser beam impinges and power is distributed over this increased size. For instance, for a laser beam having 3.14 W power with a diameter of 2 cm (and hence an area of 3.14 $cm^2$), disposed radially at 10 cm from the disk, distributes the energy over a 125.6 $cm^2$ region. This represents a localized power reduction of forty-times (40×) for a fast spinning disk.

Irradiance can thus be reduced from 1 $W/cm^2$ to 0.025 $W/cm^2$ for a full rotation cycle. Energy deposited on the target is a function of the irradiance and time. Energy deposited at any given location on the target is now a function of the irradiance and time. Energy deposited at any given location on the target can be a function of irradiance and the dwell time for the beam at that particular location on the target. Increasing power density can be obtained via the use of active cooling of the target plate.

Simplicity of instrument setup can be exemplified by the circumstances that despite the presence of surface imperfections in static target systems, these imperfections are not visible with the measurement approach exemplified in various embodiments, thus reducing the level of care required to make high quality beam profile measurements.

As described earlier an alternative, linear motion of the target plane can provide the same kind of enhancement. Motion in and out of the focal plane provides some improvement, but may sacrifice accuracy of the imager calibration and does not necessarily move the localized surface structure. Any target surface, Spectralon, Macor, aluminum, steel and others provides the same enhancement with variances due only to average grain size and reflectivity differences. A segmented target can also function in this manner. However, care should preferably be taken to avoid beat frequencies between the image frame rate and the rotation of the target as the two motions are displayed.

The complimentary analysis package provides the capability to evaluate laser beam profiles with a greater degree of flexibility and speed than attainable with alternate packages. The software allows the loading of a variety of types of data files and common analysis procedures for all file types. Enhancement in the overall process time can be on the order of a factor of one-hundred, or two orders of magnitude.

Laser beam profile characterization can be performed by a variety of software packages. As a general rule, the acquisition packages, PRIMES, BeamStar, and Spiricon all provide some level of characterization at the time of data collection. These packages also allow some level of post processing for further review of the data at a later time. Unfortunately, none of the these products provide access to all the fitting terms in a non-linear fit and background correction must be performed at the time of data acquisition only. The inability to force constraints on the non-linear fits means that prior information about the data is virtually useless and the results of the unconstrained fitting routines may be erroneous. The PRIMES device background correction does an adequate job of providing zero based data and can largely be used without further correction.

With the image based acquisition systems, BeamStar and Spiricon, background subtraction must be user implemented at the time of the beam profile measurement. This is advantageous for achieving zero based data, but these imagers have a readout feature that compromises the quality of the data. The feature is based upon the CCD readout and causes what amounts to a 'smear' on the vertical axis of the image plane. The smear may be present in nearly all images absent extreme care undertaken during the acquisition process. Unfortunately, no conventional method eliminates the feature in the software packages and thus causes errors in further beam profile analysis.

Various exemplary embodiments enable many types of beam profile measurement data for the post process analyses of laser beam profiles. By utilizing the same tools for analysis for all data types increases the comparative reliability between the different measurement techniques. In operation the software loads a data file acquired by one of the aforementioned devices and displays the resultant image in a bitmap for viewing. At this time a reasonable 'crop' window can be chosen about the beam centroid to reduce the amount of data to be processed. Once a crop setting has been selected, a new (zoomed) view of the data can be provided prior to its analyses. Common features such as centroid position, $1/e^2$ width, D4σ width, and resolution can at this time be reported to the operator.

From this juncture, the operator can choose to evaluate the total energy of the beam based upon the measured power in relationship to the integrated area of the beam, or to use non-linear least squares algorithms to fit cross-sections of the beam. The non-linear procedures can be advantageously used first at this time, as $1/e^2$ and D4σ values calculated from the grid both break down and fail with non-zero based data. That is, for inclusion of DC offset, then both of these terms are biased to higher values than would be pertinent.

By using the non-linear fit routines an estimate of the standard deviation and power term for the Gaussian profile can be accurately attained in the presence of DC, as DC can also be fit for in the routine. The relationship between the standard deviation of a Gaussian probability distribution function and the $1/e^2$ width with respect to the power term determined by the fit is estimated and gives the operator a value for $1/e^2$ or D4σ that defines the 86.5% inclusion point for laser power accurately without DC bias.

If this value is used for the calculation of the irradiance crop window (the window inclusive at 86.5%) then a more accurate measure of the irradiance can be obtained even in the presence of some DC bias. In the event that DC is not present the grid space calculations for $1/e^2$ and D4σ will agree with the non-linear estimate. If the DC bias is significant, or there is 'smear' in the image the irradiance calculations will be accordingly biased lower due to increased integrated area in the region of interest. This can be corrected in a rudimentary way by generating a non-linear grid based upon the observed DC offset and smear and simply subtracting the feature from the beam profile data.

Performing this operation generally brings the grid space calculations for $1/e^2$ and D4σ into agreement with that of the non-linear estimate and more accurate analysis of irradiance can be obtained. Another feature provided for in the software is an ability to review the effect of filtering on the beam profile data. Simple digital signal processing (DSP) techniques can be used to aid the operator to interactively define the level of filtering designed to remove the high frequency noise if so desired. A last feature of the technique, employable in software, provides a three-dimensional view of the beam profile in and OpenGL architecture for beam structure evaluation as provided in images 430 and 440 comparing profiles without and with spin translation.

The advantages of various exemplary embodiments include:
(1) ability to read a variety of file types—each individual package mentioned earlier provides some level of analysis on their particular file types, this package provides a wider variety of analysis an many file types and additional types can be added easily;
(2) automated non-linear fitting of multiple frame data—multiple frame acquisition packages such as sprircon can perform non-linear fits to the beam profile in an automated way, however, no control of the fit parameters is provided;
(3) provision of access to the fit parameters and the resultant statistics for the fit. $1/e^2$ estimation from non-linear fit—providing an accurate measure; and
(4) accurate irradiance estimation—this technique provides accurate irradiance measurements by using only the 86.5% inclusion point for $1/e^2$ from distribution theory.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for characterizing a profile of a laser beam, said method comprising:
   disposing a laser target having a surface substantially perpendicular to an incident direction, said surface being reflective at a wavelength corresponding to the laser beam;
   moving said surface along a travel direction substantially parallel to said surface;
   directing a laser emitter to emit the laser beam at said surface along said incident direction;
   measuring a reflection from said surface, said reflection representing a plurality of intensities having a distribution of positions along said surface and during a temporal interval, and
   averaging said plurality of intensities over said temporal interval for each position of said distribution to produce an analyzed beam profile, wherein each said position corresponds to a speed along said travel direction based on movement of said surface.

2. The method according to claim 1, wherein said moving said surface further comprises rotating said surface along an axis substantially parallel to said incident direction.

3. The method according to claim 1, wherein said moving said surface further comprises translating said surface along a roller belt oriented to spin along axes substantially parallel to said surface.

4. The method according to claim 1, further including:
   processing said analyzed beam profile by a D4σ method.

5. The method according to claim 1, further including:
   predicting an $e^2$ width from said analyzed beam profile.

6. The method according to claim 5, further including:
   cropping a periphery from said analyzed beam profile to produce a cropped beam profile for analysis.

7. The method according to claim 6, further including:
   applying a non-linear fit routine to said cropped beam profile to produce a resolved beam profile.

* * * * *